June 21, 1938.    G. G. MORIN ET AL    2,121,389
CONTROL FOR FLUID PRESSURE DEVICES
Filed June 13, 1936

INVENTORS
GEORGE G. MORIN AND
BY EMILE J. CARLETON
Chapin & Neal
ATTORNEYS

Patented June 21, 1938

2,121,389

UNITED STATES PATENT OFFICE 2,121,389

CONTROL FOR FLUID PRESSURE DEVICES

George G. Morin and Emile J. Carleton, Holyoke, Mass.

Application June 13, 1936, Serial No. 85,008

5 Claims. (Cl. 303—54)

This invention relates to improvements in control devices for governing the application of fluid under pressure to a power applying mechanism, such as a cylinder and piston or other motors of the expansible chamber type.

The invention, while capable of general use, is especially suitable for use in connection with the operation of brakes and clutches. It is adapted for use with brakes and clutches of machinery performing heavy duty, such as cranes, hoists, power shovels, trucks, tractors, busses, locomotives and the like. The invention is, however, equally capable of use with other classes of machinery not subjected to such heavy duty: and as conspicuous examples, the invention may be used to advantage to control the hydraulic brakes of an automobile or to control the winding drums of dipper trips, tag line winders, and hoisting and closing cables of clam shell buckets.

The invention has for an object to provide a control device by means of which fluid pressure may be applied to the mechanism, as for example one or more brakes, smoothly and gradually, from zero to a desired maximum by as small increments of pressure increase as may be desired and by means of which the pressure may be released in the same manner.

A further object of the invention is to provide a control device which may be set in any one of various positions to provide for the application of any desired degree of pressure on the power applying mechanism and which will automatically maintain the pressure for which it is set,—admitting or releasing fluid to said mechanism as may be necessary to compensate for decreases or increases in pressure in such mechanism from whatever cause.

These and other objects will best be understood as the detailed description proceeds and they will be pointed out in the appended claims.

The invention will be disclosed with reference to the accompanying drawing in which.

Figure 1:
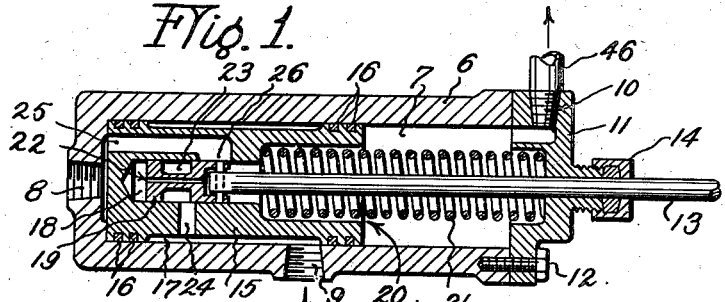
Fig. 1 is a sectional elevational view of a control device embodying the invention,—the parts being shown in the relative positions which they occupy when the brake is fully released.

Referring to this drawing, the control device includes a casing 6 affording a cylinder 7 which is entirely closed except for the ports 8, 9 and 10. Conveniently, the cylinder has a removable head 11, held in place by screws 12 and forming one end of cylinder 7. A control rod 13 passes through head 11 and a suitable stuffing box 14, and is slidable therein in a direction axially of the cylinder 7, being movable back and forth by any suitable means, manual or otherwise. The port 8 is formed in the opposite end of cylinder 7 and is adapted for connection to the motor means which is to be actuated by fluid pressure. The ports 9 and 10 are for the inflow and outflow respectively, of fluid from the cylinder. Port 9 is formed in the peripheral wall of cylinder 7, at a point intermediate its ends, while port 10 is preferably formed in head 11.

Figure 2:
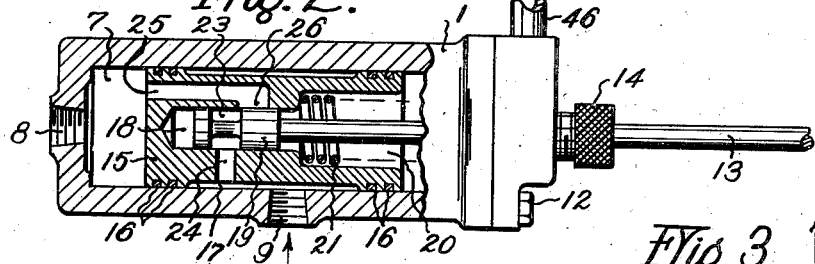
Figs. 2, 3 and 4 are views generally similar to Fig. 1 but showing the parts in various other relative positions and illustrating, respectively, the inflow of fluid, the cutting off of fluid against inflow or outflow, and the outflow of fluid.
Figure 3:
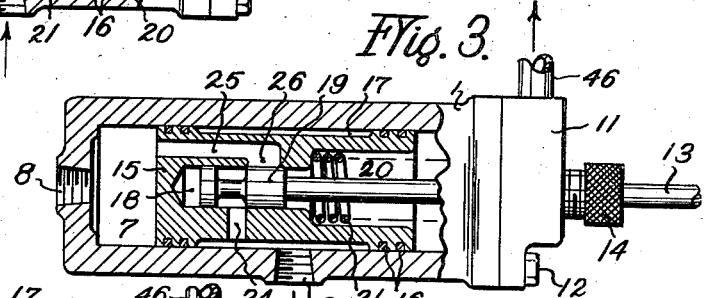
Figure 4:
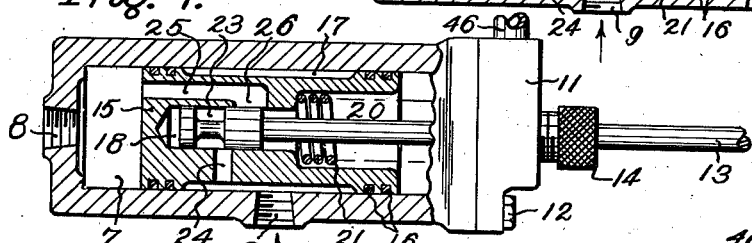

Slidable in cylinder 7 is a piston 15 which may be, and preferably is, provided with rings 16 or other means to secure a liquid tight engagement between the piston and the cylinder wall. As shown, these rings are provided in sets, disposed one near each end of the piston. Between these sets of rings the piston is provided with an annular groove 17 of such length as to maintain communication with port 9 for every position that the piston may assume in cylinder 7. The piston has a coaxial bore 18, forming a cylinder to slidably receive a piston valve 19, which is mounted on the inner end of the control rod 13 in such a manner that the piston valve is free to seek its own bearing in cylinder 18. This cylinder is closed at that end nearest port 8, and at its other end is open and in free and constant communication with the right hand end of cylinder 7 and thus with port 10. Cylinder 18 opens into a bore 20 of slightly larger diameter which receives one end of a coil spring 21, such end seating on the shoulder formed at the intersection of the bores 18 and 20. The other end of spring 21 is seated in a recess in head 11. The piston valve 19 has a passage 22 (Fig. 1) extending coaxially from one end to the other, to equalize the pressure acting on opposite ends of the piston valve and to thereby balance the valve. This valve has an annular groove 23, which is in constant communication with groove 17 and thus with admission port 9, by means of a radial passage 24 in piston 15. It will be noted that the fluid admitted through passage 24 into groove 23 acts equally in axially opposite directions on the piston valve. The valve is thus balanced and the fluid entering or leaving cylinder 7 has no tendency to move the piston valve in the direction of its axis. The piston 7 is provided with a passage 25 extending from the left hand end face of the piston longitudinally inward and terminating in a port 26 which opens into cylinder 18 and is adapted to be opened and closed by the piston valve 19. The longer of the two cylindrical portions of large diameter of member 19 is effective for controlling port 26. Such portion may cover port 26 and entirely cut it off from communication with both of ports 9 and 10, as shown in Fig. 3; or it may be moved outwardly by a pull on rod 13 to admit fluid from port 9 to passage 25 as shown in Fig. 2; or it may be moved inwardly by a push on rod 13 to connect passage 25 to port 10 as shown in Figs. 1 and 4.

The control device described may be used in various fluid pressure systems which include a motor means operable by fluid pressure. One exemplary apparatus, with which the control device may be used, is shown in conventional form in Fig. 5. This figure shows an hydraulic brake apparatus, whereof the shoe and drum are shown at 30 and 31, respectively. The shoe 30 is operatively connected to the piston rod 32 of a motor of the expansible chamber type, including a piston 33 and cylinder 34, the right hand end of which is connected by a pipe 35 to the port 8 of the control device. The left hand end of cylinder 34 is vented, as indicated, and is provided with a spring in chamber 36 for returning the piston 33 when the fluid pressure is released from the cylinder. The port 9 is connected by a pipe 37 to any suitable source of fluid pressure. As shown herein, it is connected to a reservoir 38 which is supplied with liquid through a pipe 39 by a suitable pump, such as the gear pump 40. This pump draws liquid from a supply tank 41 through the suction pipe 42. A by-pass 43 is provided around the pump 40, interconnecting the suction and discharge pipes 42 and 39, and this by-pass is controlled by a relief valve 44, which opens when the pressure in pipe 42 reaches a predetermined value and allows liquid to pass back to the suction pipe 42. The arrangement affords a supply of liquid at a constant predetermined pressure. The reservoir 38 is closed at its upper end and the pipe connections 37 and 39 both enter at the opposite end, whereby air is trapped in the upper portion of the tank, forming an air cushion indicated at 45, which functions to absorb shocks and provides for resiliency in the application of liquid pressure to the operating member 33. The port 10 is preferably connected as shown by a pipe 46 to the supply tank 41 and this tank is vented to the atmosphere, as indicated conventionally at 47. The pipe line 39 is preferably provided with one or more check valves 48 to prevent the return flow of liquid. If desired, the by-pass system 43, 44 may be omitted and the desired pressure in tank 38 secured by regulating the total amount of fluid in the system as a whole. This will not give as accurate regulation of pressure in the tank 38 as the construction first described, but is simpler and uses less power since the pump 40 turns idly unless there is liquid reaching it from the tank 41. The variation of pressure is not of importance since the device, as will appear below, will operate to maintain at the port 8 a pressure determined by the setting of the control valve and unaffected by variations in the pressure at the entrance port 9 as long as the latter is above the valve for which the control valve is set.

Figure 5:
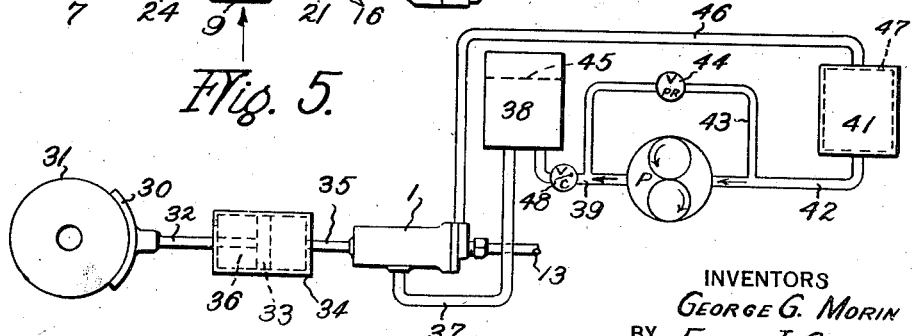
Fig. 5 is a diagrammatical view of a brake system, showing the relationship of the control device with other parts of the system.

It will be appreciated that the apparatus schematically shown in Fig. 5 is merely an illustrative example of one of many uses of the invention. The pressure fluid may be liquid or gaseous and it may be maintained under any desired pressure in the supply reservoir 38. So also, the brake device with its operating cylinder and piston is illustrative of one of many power applying mechanisms which may be controlled to advantage with the control device of this invention. And there may be as many of these mechanisms connected up to and controlled by the one control device as is desired. The control device, of course, may be located at any convenient point and that point may be, and usually is, remote from the power applying mechanism and pressure reservoir.

The operation of the control device will next be described. With the power applying mechanism in released or inactive position, the parts of the control device are positioned as shown in Fig. 1. The piston 15 has been moved by spring 21 to the left hand end of cylinder 7 and the piston valve 19 is in position to cut off the supply of pressure fluid to port 26 and such port is open to the right hand end of cylinder 7 and thus to port 10, which is in communication with the atmosphere through the pipe connection 46 with the vented tank 41. To apply pressure to power applying mechanism, the control rod 13 is moved to the right, thus moving the piston valve 19 to cut off the communication between ports 26 and 10 and open port 26 to the annular space 23. The condition which then exists is shown in Fig. 2, and fluid enters port 26 and passage 25 into the left hand end of cylinder 7 and by way of port 8 and pipe 35 to the power cylinder 34. As the pressure builds up in the left hand end of cylinder 7, the piston 15 is moved to the right, stressing spring 21, and the piston continues to move until the force of the stressed spring is balanced by the pressure in the left hand end of the cylinder. Assuming that the piston valve 19 is stationary, the movement of piston 15 will eventually cause port 26 to be covered by the valve and the supply of pressure fluid to be cut off, as shown in Fig. 3. If valve 19 is now moved further to the right, port 26 will again be opened and fluid will enter the left hand end of the cylinder and move piston 15 to the right until the supply of pressure fluid is again cut off. Each increment of movement of rod 13 to the right, results in the establishment of increased pressure in the left hand end of cylinder 7. Such pressure is proportional to the movement of the rod. A slow movement of the rod, or a movement of it step by step by small increments, enables the pressure to be gradually built up from zero to the desired maximum and the increments of pressure increase may be as small as desired. In like manner the pressure may be released gradually by a slow movement of rod 13 to the left or by a movement of it step by step. If the rod 13 is moved inwardly a slight distance as shown in Fig. 4, valve 19 will uncover port 26 and allow it to communicate with the outflow port 10 and fluid will leave the left hand end of cylinder 7. As the pressure at such end diminishes, the spring 21 will move piston 15 to the left until the port 26 is covered by valve 19. A less pressure then exists in the cylinder. By continued movement of rod 13 to the left, this pressure may be reduced until it reaches zero when the parts are again positioned as shown in Fig. 1.

Assuming now that the rod 13 has been moved to a certain position and is held stationary in such position to maintain a predetermined pressure on the power applying mechanism, the desired predetermined pressure will be automatically maintained. For example, suppose the valve 19 is held stationary in the position of Fig. 3, now if there should be a leak in the power applying mechanism or in the pipe connections thereto, the pressure in the left hand end of cylinder 7 will drop and as soon as it does so, spring 21 moves piston 15 to the left, allowing pressure fluid to be admitted to said end of the cylinder until the desired pressure is reestablished, when piston 15 will again be moved back into the illustrated position. The pressure applied to the fluid pressure device is spring cushioned and is not subject to sudden increase if the reaction of the fluid pressure device increases. Thus if for any reason, an increase in pressure occurs in the power applying mechanism, that increase will act to move piston 15 to the right and release fluid from the left hand end of cylinder 7 until the desired pressure is reestablished, when piston 15 will again be moved back into the illustrated position.

In a similar manner the pressure at port 8 will be unaffected by variations in the pressure at the port 9 due to variations in the pressure in the supply tank 38 as long as this pressure is greater than that desired at the port 8. The pressure from this reservoir is balanced both upon the piston 15 and upon the valve 19, and the position of the piston is due solely to the balance between the fluid pressure at one end and the spring pressure at the other. This complete separation of the output pressure from the input pressure (subject only to a minimum value of the latter) is of great importance in many installations.

The invention affords an easily operable control because the valve 19 is balanced and it is thus feasible for the control to be used to govern the application of very heavy pressures to power applying mechanisms, such as the brakes or clutches of power shovels, cranes, hoists and all kinds of material handling machinery, also for large trucks, busses, tractors and the like. The control device is not only easily operable but, more important still, it is sensitive and enables the pressure to be applied or diminished smoothly, evenly and as gradually as desired, even after the fluid pressure device has reached a stationary condition. It also provides for the maintenance of a selected pressure, irrespective of conditions which tend to diminish or increase the pressure in the power applying mechanism.

What we claim is:

1. A control device for fluid-pressure devices, comprising a casing, a piston movable back and forth therein and subjected on one side to and movable in one direction by the pressure of the fluid supplied to the device, yieldable means acting on the other side of the piston for moving it in the opposite direction, a single piston valve element mounted in said piston for movement back and forth in a path parallel to that of the piston, and a control rod fixed directly to said element and extending outside said casing, said piston having a passage leading from the first-named side to said valve element and controlled by the latter and having fluid admission and discharge passages alternatively connectible to said first named passage by said valve element.

2. A control device for fluid pressure devices, comprising, an outer cylinder having at one end a port for connection to the device and near the opposite end a port for the discharge of fluid and intermediate its ends a port for the admission of fluid, a piston in said cylinder, a spring for moving the piston toward the first-named port, said piston having an inner cylinder open at one end for communication with said discharge port and closed at the opposite end, said piston having a passage for affording constant communication between said admission port and the closed end of the inner cylinder and a second passage between the inner cylinder and the first named end of the outer cylinder, a piston valve mounted in the inner cylinder and operable to close said second passage or to connect it to either end of the inner cylinder, and a control rod connected to the piston valve and extending outside the outer cylinder.

3. A control device for fluid pressure devices, comprising an outer cylinder having at one end a port for connection to the device and near the opposite end a port for the discharge of fluid and intermediate its ends a port for the admission of fluid, a piston in said cylinder, a spring for moving the piston toward the first-named port, said piston having an inner cylinder open at one end for communication with said discharge port and closed at the opposite end, said piston having a passage for affording constant communication between said admission port and the closed end of the inner cylinder and a second passage between the inner cylinder and the first named end of the outer cylinder, a piston valve mounted in the inner cylinder and balanced with respect to the pressure at both the admission and discharge ports, said piston valve being operable to close said second passage or to connect it to either end of the inner cylinder, and a control rod connected to the piston valve and extending outside the outer cylinder.

4. A control device for fluid pressure devices, comprising an outer cylinder having at one end a port for connection to the device and near the opposite end a port for the discharge of fluid and intermediate its ends a port for the admission of fluid, a piston in said cylinder having intermediate its ends a recess in its periphery of sufficient length to afford communication with said admission port at all positions which the piston may assume throughout its range of movement, a spring for moving the piston toward the first-named port, said piston having an inner cylinder open at one end for communication with said discharge port and closed at the opposite end, said piston having a passage connecting the inner cylinder at a point intermediate its ends to said recess and a second passage connecting the inner cylinder at a point between the first passage and said open end to the first named end of the outer cylinder, a piston valve mounted in the inner cylinder and operable to close said second passage or to connect it to either end of the inner cylinder, and a control rod connected to the piston valve and extending outside the outer cylinder.

5. A control device for a fluid pressure device comprising a casing forming the sides and one end of a pressure chamber, an output port opening from said chamber for connection to the device to be operated, a member movable in said casing and having one end wall acting as the second end of the pressure chamber, a spring urging said member towards the first named end of the chamber, a single valve member within the casing and movable relative thereto and to said movable member, a control rod fixed directly to said valve and extending outside the casing, a fluid pressure port opening into the casing, a discharge port opening into the casing, and passages in said movable member connecting with said pressure chamber, said ports, and the valve; said valve being formed so that in certain positions relative to the movable member it will connect the inlet port to the pressure chamber through certain of said passages and block off the passage in the movable member leading to the discharge port, and so that in certain other relative positions which will be assumed if the valve is held in said first named position and the movable member moves in a direction to compress the spring it will connect the pressure chamber with the passage in the movable member leading the exhaust port and block off connection of the pressure chamber to the inlet port.

GEORGE G. MORIN.
EMILE J. CARLETON.